United States Patent
Iwata et al.

[11] Patent Number: 5,821,180
[45] Date of Patent: Oct. 13, 1998

[54] LAMINATE COMPRISING A POLYURETHANE LAYER

[75] Inventors: Shizuo Iwata; Shinya Kato, both of Kurashiki; Tetsuya Ashida; Hisao Yoneda, both of Okayama; Koji Hirai, Kurashiki, all of Japan

[73] Assignee: Kuraray Co., Ltd., Kurashiki, Japan

[21] Appl. No.: 910,122

[22] Filed: Aug. 13, 1997

Related U.S. Application Data

[63] Continuation of Ser. No. 490,894, Jun. 16, 1995, abandoned.

[30] Foreign Application Priority Data

Jul. 1, 1994 [JP] Japan ..................................... 6-171606

[51] Int. Cl.$^6$ .............................. D21H 19/24; D06N 3/14; B32B 9/00
[52] U.S. Cl. ............................ 442/423.1; 442/43; 442/85; 528/51; 528/56; 528/58; 528/65; 528/83; 528/440; 528/453
[58] Field of Search .................................. 528/65, 51, 56, 528/58, 83; 525/440, 453; 442/43, 85, 423.1

[56] References Cited

U.S. PATENT DOCUMENTS 5,310,852  5/1994  Hirai et al. .

FOREIGN PATENT DOCUMENTS 0 194 452  9/1986  European Pat. Off. .
0 569 150  11/1993  European Pat. Off. .

*Primary Examiner*—Richard Weisberger
*Attorney, Agent, or Firm*—Oblon, Spivak, McClelland, Maier & Neustadt, P.C.

[57] ABSTRACT

A laminate comprising a layer formed by melt molding a thermoplastic polyurethane and a fibrous base layer, a film or sheet melt molded from the thermoplastic polyurethane, and a thermoplastic polyurethane composition comprising the thermoplastic polyurethane and tin compound in an amount of 0.3 to 15 ppm (in terms of tin atom) based on the thermoplastic polyurethane; the thermoplastic polyurethane being a thermoplastic polyurethane obtained from a polymeric diol (a) having a number average molecular weight of 1,500 to 4,000, an organic diisocyanate (b) and a chain extender (c) and having an inherent viscosity of at least 0.9 dl/g and a retention of long-chain hard segments when heat melted of at least 80%, the polymeric diol (a) having a crystallization enthalpy ($\Delta H$) of not more than 70 J/g and having low molecular diol units comprising at least 30 mole % of 1,9-nonanediol units. These articles are excellent in resistance to abrasion melting and abrasion and resistance to bleed/whitening and also good in tensile strength and like mechanical properties, durability and cold resistance, as well as softness and flexibility, so that they can be used for leather-like products and other various purposes.

11 Claims, 1 Drawing Sheet

LAMINATE COMPRISING A POLYURETHANE LAYER

This application is a Continuation of application Ser. No. 08/490,894, filed Jun. 16,1995, now abandoned.

BACKGROUND OF THE INVENTION

1. Field of the Invention

The present invention relates to laminates comprising a thermoplastic polyurethane layer and a fibrous base layer, melt molded films or sheets from a thermoplastic polyurethane and thermoplastic polyurethane compositions. More specifically, the present invention relates to laminates comprising a thermoplastic polyurethane layer and a fibrous base layer, melt molded films or sheets from the thermoplastic polyurethane and compositions comprising the thermoplastic polyurethane, which are excellent in resistance to abrasion melting, abrasion resistance and resistance to bleed whitening and in mechanical properties such as tensile strength, durability such as water resistance, cold resistance and like properties, as well as in softness and flexibility and hence effectively usable for a wide variety of purposes, such as sporting goods, shoes, bags and similar containers, boxes, interiors for buildings including houses, decorative sheets for furniture, apparels and various films and sheets.

2. Description of the Prior Art

Sheets with leather-like appearance comprising a fibrous base and, provided on the surface thereof, a thermoplastic elastomer layer have, utilizing their low cost, good water resistance, good soil resistance, lightweightness and like features, been widely used as substitutes for natural leather. Conventional leather-like sheets are obtained by, for example, the following processes. ① A process which comprises extrusion molding a thermoplastic elastomer into a film and then laminating the film on a fibrous base by using an adhesive or by heating; ② one which comprises applying a solution of a thermoplastic elastomer on a fibrous base and then precipitating the thermoplastic elastomer with a solvent having poor compatibility therewith or water to form a layer of the thermoplastic elastomer on the surface of the fibrous base; and ③ applying a solution of a thermoplastic elastomer on a fibrous base and removing the solvent by hot air drying or like methods to form a layer of the thermoplastic elastomer on the surface of the fibrous base. In these cases, the thermoplastic surface layer is grained by embossing with a hot gravure roll or by so shaping upon extrusion molding of the thermoplastic elastomer into film.

Laminates comprising a fibrous base and, on the surface thereof, a polyurethane layer have also been produced by a known process of applying a solution of the polyurethane in a solvent with a gravure roll or by spraying.

However, the above conventional leather-like sheets, for which emphasis has been put on utilization of the flexibility and hand of the thermoplastic polyurethanes used, have poor resistance to abrasion melting and abrasion itself, as well as insufficient water resistance, cold resistance and durability. Increasing the thickness of the thermoplastic elastomer layer has therefore been practiced when these sheets are used for those purposes that require good resistance to severe abrasion and the like, which, however, impairs the flexibility or hand. Such being the case, there has been desired a leather-like sheet which, while maintaining good flexibility and hand, is excellent in resistance to abrasion melting and abrasion itself and, at the same time, by no means inferior to conventional ones in tensile strength, water resistance, cold resistance, durability and like properties.

Besides, the above process for producing laminates comprising a fibrous base and, provided on the surface thereof, a polyurethane layer cannot form a polyurethane layer having the intended thickness by one-time application operation and requires a multiple-application operation. Furthermore, solutions obtained by dissolving in a solvent the thermoplastic polyurethane or its composition used in the invention to be described later herein, being highly viscous, have markedly poor processability and give laminates with unsatisfactory resistance to abrasion and abrasion melting.

SUMMARY OF THE INVENTION

Accordingly, an object of the present invention is to provide a laminate comprising a fibrous base and a layer of a thermoplastic elastomer or a film or sheet comprising the thermoplastic elastomer, which, while maintaining a good flexible hand, is excellent in resistance to abrasion, abrasion melting and bleed whitening and by no means inferior to conventional leather-like sheets in tensile strength and like mechanical properties, water resistance, cold resistance, durability and the like.

Another object of the present invention is to provide a thermoplastic elastomer composition which is effectively usable for producing the above leather-like sheet, film or sheet having the excellent features.

As a result of an extensive study to achieve the above objects, the present inventors have found the following facts. That is, i) a specific thermoplastic polyurethane obtained by reacting a specific polymeric diol obtained with a low molecular diol containing at least 30 mole % of 1,9-nonanediol, an organic diisocyanate and a chain extender having excellent resistance to abrasion, abrasion melting and bleed whitening and, while being comparable with conventional ones in tensile strength and like mechanical properties, water resistance, cold resistance and durability, having good softness and flexibility; ii) laminates obtained by forming on a fibrous base a melt molded layer of this thermoplastic polyurethane, and melt molded films or sheets comprising the thermoplastic polyurethane itself have leather-like appearance and tactility and are usable, thanks to the above excellent features, for a variety of purposes; and iii) use of a tin-based urethanization catalyst on producing the above specific polyurethane comprising the specific polymeric diol obtained by using 1,9-nonanediol causes the resulting polyurethane to be of still better resistance to abrasion and abrasion melting.

Thus, the present invention provides a laminate comprising a polyurethane layer and a fibrous base, said polyurethane layer being a melt molded layer of a thermoplastic polyurethane obtained from a polymeric diol (a) having a number average molecular weight of 1,500 to 4,000, an organic diisocyanate (b) and a chain extender (c) and having an inherent viscosity of at least 0.9 dl/g and a retention of long-chain hard segments when heat melted of at least 80%, said polymeric diol (a) having a crystallization enthalpy ($\Delta H$) of not more than 70 J/g and having low molecular diol units comprising at least 30 mole % of 1,9-nonanediol units.

The present invention also provides a film or sheet melt molded from a thermoplastic polyurethane obtained from a polymeric diol (a) having a number average molecular weight of 1,500 to 4,000, an organic diisocyanate (b) and a chain extender (c) and having an inherent viscosity of at least 0.9 dl/g and a retention of long-chain hard segments when heat melted of at least 80%, said polymeric diol (a) having a crystallization enthalpy ($\Delta H$) of not more than 70

J/g and having low molecular diol units comprising at least 30 mole % of 1,9-nonanediol units.

The present invention further provides a thermoplastic polyurethane composition comprising a thermoplastic polyurethane and a tin compound having catalytic activity for urethanization reaction in an amount of 0.3 to 15 ppm (in terms of tin atom) based on the polyurethane, said polyurethane being obtained from a polymeric diol (a) having a number average molecular weight of 1,500 to 4,000, an organic diisocyanate (b) and a chain extender (c) and having an inherent viscosity of at least 0.9 dl/g and a retention of long-chain hard segments when heat melted of at least 80%, said polymeric diol (a) having a crystallization enthalpy (ΔH) of not more than 70 J/g and having low molecular diol units comprising at least 30 mole % of 1,9-nonanediol units.

The laminate comprising a polyurethane layer and a fibrous base layer, film or sheet melt molded from the polyurethane and polyurethane composition, all according to the present invention, are excellent in resistance to abrasion melting, abrasion resistance and resistance to bleed whitening and, while having the same good level of mechanical properties such as tensile strength, durability, cold resistance and like properties, also excellent in softness and flexibility, and hence effectively usable for a wide variety of purposes, such as sporting goods, shoes, bags and similar containers, boxes, interiors for buildings including houses, decorative sheets for furniture, apparels and various films and sheets.

BRIEF DESCRIPTION OF THE DRAWING

A more complete appreciation of the invention and many of the attendant advantages thereof will be readily obtained as the same become better understood by reference to the following detailed description when considered in connection with the accompanying drawing, wherein.

DETAILED DESCRIPTION OF THE PREFERRED EMBODIMENTS

Figure 1:
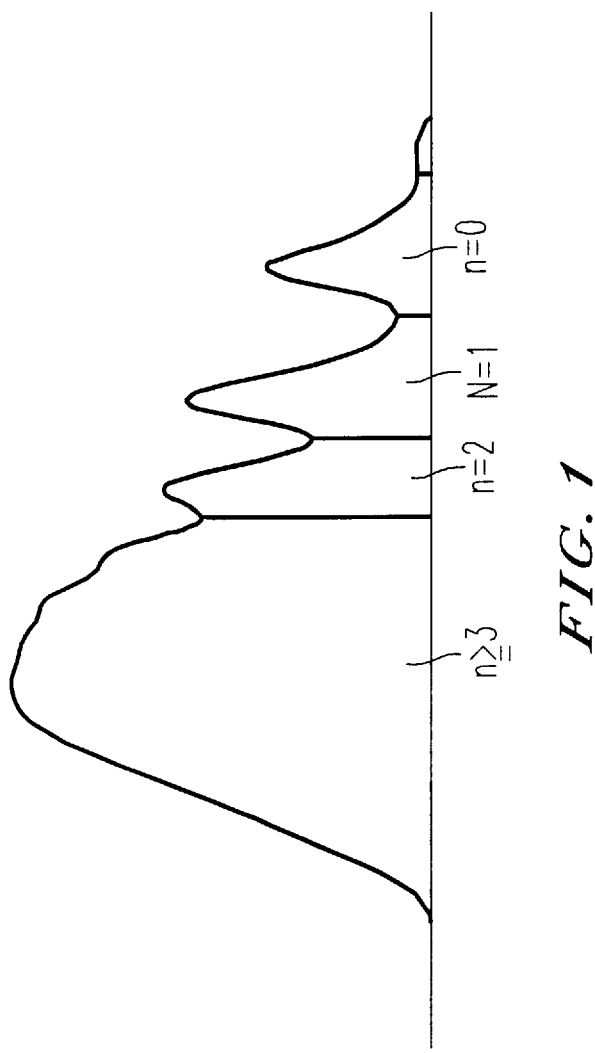
FIG. 1 is a chart of GPC analysis of the hard segments of the polyurethane obtained in Example 3.

The thermoplastic polyurethane used in the present invention (hereinafter simply referred to as "polyurethane") is obtained from the above specific polymeric diol (a) obtained by using a low molecular diol comprising at least 30 mole % of 1,9-nonanediol, an organic diisocyanate (b) and a chain extender (c). The specific polymeric diol (a) has ester bonds and may be selected from a polyester diol, polyesterpolycarbonate diol, polycarbonate diol or polyetherester diol. In the present invention, these polymeric diols may be used singly or in combination of 2 or more.

More concrete examples of the polymeric diol (a) are polyester diols, e.g. aliphatic polyester diols obtained by reacting a low molecular aliphatic diol and an aliphatic dicarboxylic acid or ester forming derivatives thereof and aromatic polyester diols obtained by reacting a low molecular aliphatic diol and an aromatic dicarboxylic acid or ester forming derivatives thereof; polyetherester diols, e.g. polyetherester diols obtained by reacting a polyalkylene glycol and an aliphatic dicarboxylic acid, aromatic dicarboxylic acid or ester forming derivatives of the foregoing and polyetherpolyester diols obtained by reacting a polyalkylene glycol and an aromatic or aliphatic polyester; polycarbonate diols obtained by reacting a low molecular aliphatic diol and a carbonate; and polyesterpolycarbonate diols obtained by reacting the above polyester diol and polycarbonate diol.

With any of the above polymeric diols, it is necessary that at least 30 mole % of low molecular diol units (glycol units) constituting the polymeric diol (a) used in the present invention be 1,9-nonanediol units [—O—(CH$_2$)$_9$—O—]. A content of 1,9-nonanediol in the polymeric diol (a) of at least 30 mole % makes the resulting polyurethane have good resistance to abrasion melting and abrasion. To obtain still better resistance to abrasion melting and abrasion, the content of 1,9-nonanediol units is preferably at least 35 mole % of low molecular units constituting the polymeric diol (a).

The polymeric diol (a) may contain less than 70 mole % of units from low molecular diols other than 1,9-nonanediol. Examples of such other low molecular diols are ethylene glycol, 1,4-butanediol, 2-methyl-1,3-propanediol, 1,6-hexanediol, 3-methyl-1,5-pentanediol, 2-methyl-1,8-octanediol and neopentyl glycol. These other low molecular diols may be used singly or in combination of 2 or more.

Examples of the dicarboxylic acid component constituting the polymeric diol (a) are aliphatic dicarboxylic acids, e.g. succinic acid, glutaric acid, adipic acid, azelaic acid, sebacic acid and dodecanedicarboxylic acid; aromatic dicarboxylic acids, e.g. terephthalic acid, isophthalic acid and orthophthalic acid; and ester forming derivatives of the foregoing. These dicarboxylic acid components may be used singly or in combination of 2 or more. Use of a polymeric diol (a) obtained from, among the above aliphatic and aromatic dicarboxylic acid components, an aliphatic acid component having 6 to 10 carbon atoms, such as adipic acid, azelaic acid or sebacic acid, or mixtures of the foregoing, provides a polyurethane having good cold resistance and mechanical properties. Use of a polymeric diol (a) containing at least 20 mole % based on the total dicarboxylic acid units of an aromatic dicarboxylic acid such as terephthalic acid, isophthalic acid, orthophthalic acid or mixtures of the foregoing, in particular terephthalic acid and/or isophthalic acid provides the resulting polyurethane with good heat resistance and mechanical properties.

In the present invention, it is desirable to use as the polymeric diol (a) one selected from, among the above various polymeric diols, polyester diols. In this case, the polyester diol used can be produced by reacting 1,9-nonanediol alone or a mixture of 1,9-nonanediol and less than 70 mole % of other low molecular diols, with an aliphatic dicarboxylic acid (e.g. adipic acid, azelaic acid, sebacic acid, dodecanedicarboxylic acid and mixtures thereof), an aromatic dicarboxylic acid (e.g. terephthalic acid, isophthalic acid, orthophthalic acid and mixtures thereof) or ester forming derivatives of the foregoing, by transesterification, direct esterification or like known processes.

It is necessary that the polymeric diol (a) used in the invention have a crystallization enthalpy (ΔH) of not more than 70 J/g. With the crystallization enthalpy (ΔH) exceeding 70 J/g, the melt molded layer of the resulting polyurethane or the sheet or film of the resulting polyurethane has a whitened surface and poor appearance, thereby having poor resistance to bleed whitening, as well as poor cold resistance and low temperature flexibility.

Recommended processes for producing a polymeric diol (a) having a crystallization enthalpy (ΔH) of not more than 70 J/g are one which comprises copolymerizing, in the main chain of the polymeric diol (a), a diol component with methyl group, such as 2-methyl-1,3-propanediol, 3-methyl-1,5-pentanediol, neopentyl glycol or 2-methyl-1,8-octanediol, in an amount of not more than 60 mole %, and one which comprises copolymerizing, in the polymeric diol (a) a dicarboxylic acid component of an aromatic dicarboxylic acid such as isophthalic acid, orthophthalic acid or terephthalic acid. The crystallization enthalpy (ΔH) herein means the value determined by the method described in the Examples given later.

It is also necessary in the present invention that the polymeric diol (a) used for producing the polyurethane have a number average molecular weight of 1,500 to 4,000, from the viewpoints of the mechanical properties, resistance to abrasion and abrasion melting, low temperature characteristics, moldability and the like of the resulting polyurethane. The number average molecular weight of the polymeric diol (a) used is preferably in a range of 2,000 to 3,500. If the number average molecular weight is less than 1,500, the resulting polyurethane will have poor mechanical properties such as tensile strength and poor resistance to abrasion and abrasion melting and poor low temperature characteristics. On the other hand, if the number average molecular weight exceeds 4,000, there will generate, on extrusion molding of the resulting polyurethane, spots such as fish-eye so that it becomes difficult to achieve the stability of throughput.

The number average molecular weight of polymeric diol (a) referred to herein is that calculated based on the hydroxyl group value determined in accordance with JIS K1577.

The polymeric diol (a) used in the invention can be produced by using a compound selected, according to the type of the polymeric diol (a), from a diol, dicarboxylic acid, carbonate or ether and conducting, preferably in the presence of a titanium-based esterification catalyst (hereinafter referred to simply as "titanium-based catalyst"), polycondensation or polymerization, such as direct esterification, transesterification or ring-opening polymerization. In the above, the esterification includes esterification and transesterification of alcohols with carboxylic acids, carbonates (e.g. dialkyl carbonate, alkylene carbonate and diaryl carbonate) or ester forming derivatives of the foregoing and ring-opening polymerization of lactones.

It is desirable, when the polycondensation or polymerization is conducted in the presence of titanium-based catalyst, to deactivate it after completion of the reaction. If a polymeric diol (a) with the titanium-based catalyst not deactivated is used, the resulting polyurethane will have a low retention of long-chain hard segments when heat melted, so that laminates, sheets or films comprising the polyurethane after melt molding have poor resistance to abrasion and abrasion resistance.

Examples of usable processes for deactivating titanium-based catalyst are one which comprises contacting with water the polymeric diol (a) obtained after completion of esterification and one which comprises treating the polymeric diol (a) with a phosphorus compound such as phosphoric acid, phosphoric acid esters, phorphorous acid or phosphorus acid esters. With the process of deactivating titanium-based catalyst by contacting with water, it is recommended to add at least 1% by weight of water to the polymeric diol (a) obtained by esterification and heat the mixture at a temperature of 70 to 150° C., preferably 90° to 130° C., for 1 to 3 hours. The deactivation treatment may be conducted either under atmospheric pressure or under a pressure. Reducing the pressure of the reaction zone after deactivation of the titanium-based catalyst titanium-based catalyst titanium-based catalyst can remove the water used for the deactivation and is hence desirable.

Where a titanium-based catalyst is used on production of the polymeric diol (a), any of known titanium-based catalysts used for producing polymeric diols may be used with no specific restrictions. Examples of preferred titanium-based catalysts are titanic acid, tetraalkoxy titanium compounds, titanium acylates and titanium chelate compounds. More concrete examples are tetraalkoxy titanates, such as tetraisopropyl titanate, tetra-n-butyl titanate, tetra-2-ethylhexyl titanate, tetrastearyl titanate; titanium acylates, such as polyhydroxytitanium stearate and polyisopropoxytitanium stearate; and titanium chelate compounds, such as titanium acetylacetonate, triethanolamine titanate, titaniumammonium lactate, titanium ethyllactate and titanium octylglycolate.

The amount used of the titanium-based catalyst can be, with no particular limitation, suitably adjusted according to the desired polymeric diol (a) and the polyurethane to obtain therefrom, and is generally preferably in a range of about 0.1 to 50 ppm, more preferably in a range of about 1 to 30 ppm.

The organic diisocyanate (b) used in the present invention for producing polyurethane may be any one of organic diisocyanates which have been used for producing polyurethanes and, thus, may be an aromatic, alicyclic or aliphatic diisocyanate, alone or in combination of 2 or more. Examples of organic diisocyanates usable in the present invention are aromatic diisocyanates, such as 4,4'-diphenylmethane diisocyanate, toluene diisocyanate, phenylene diisocyanate, naphthalene diisocyanate, isophorone diisocyanate, xylylene diisocyanate, 3,3'-dichloro-4,4'-diphenylmethane diisocyanate; and aliphatic or alicyclic diisocyanates, such as hexamethylene diisocyanate, 4,4'-dicyclohexylmethane diisocyanate and hydrogenated xylylene diisocyanate, among which 4,4'-diphenylmethane diisocyanate and paraphenylene diisocyanate are preferred.

Any one of known chain extenders conventionally used for producing polyurethanes can be used as the chain extender (c) in the present invention, with no specific restrictions. Examples of usable chain extenders are low molecular diols, diamines, hydrazine or dicarboxylic acid hydrazides, among which low molecular diols, alicyclic diols and aromatic diols are preferably used, either alone or in combination of 2 or more. Examples of diols usable as the chain extender (c) are linear or branched aliphatic diols having 2 to 10 carbon atoms, e.g. ethylene glycol, diethylene glycol, 1,2-propanediol, 1,4-butanediol, 1,5-pentanediol, neopentyl glycol, 2-methyl-1,3-propanediol, 1,6-hexanediol, 3-methyl-1,5-pentanediol, 2-methyl-1,8-octanediol, 1,9-nonanediol, 2,2-diethyl-1,3-propanediol, 2-butyl-2-ethyl-1,3-propanediol and 3-methyl-1,5-pentanediol; alicyclic diols, e.g. bis(hydroxymethyl) tricyclo-[5.2.1.0$^2$,$^6$] decane and aromatic ring-containing diols, e.g. 1,4-bis(β-hydroxyethoxy)benzene.

It is desirable to used as the chain extender (c), among these diols, 1,4-butanediol or 1,4-bis(β-hydroxyethoxy) benzene alone, 1,4-butanediol in combination with 1,9-nonanediol, or 1,4-butanediol in combination with 1,4-bis(β-hydroxyethoxy)benzene.

It is suitable, in producing the polyurethane used in the invention, to use one of the above diisocyanates in an amount of isocyanate group of about 0.98 to 1.08 equivalent, more preferably about 1.00 to 1.02, based on the total amount of active hydrogen atoms possessed by the polymeric diol (a), chain extender (c) and other components. Adjusting the ratio between the amounts of active hydrogen atoms and isocyanate groups within the above range provides the resulting polyurethane laminate, sheet or film with excellent resistance to abrasion and abrasion melting.

It is desirable to set the molar ratio between the polymeric diol (a) and the chain extender (c) in a range of 1:0.8 to 1:12.9.

Each of the molecules of the polyurethane obtained by reacting a polymeric diol (a), an organic diisocyanate (b) and a chain extender (c) comprises soft segments originating from the high molecular polymeric diol (a) and hard segments from the organic diisocyanate (b). The hard segments are generally constituted of, among the components of polymeric diol (a), organic diisocyanate (b) and chain extender (c) components (b) and (c). That is, each of the hard segments component is constituted of at least one repeating unit that contains a urethane bond formed by addition of one component (b) and one component (c), or one component (b). The term "long-chain hard segments" herein means hard segments containing at least 3 of the above repeating units.

The "retention of long-chain hard segments when heat melted" herein means the ratio between the content of long-chain hard segments in the molecule of a polyurethane when a film or sheet comprising the polyurethane or a composition comprising the polyurethane is heat-melt treated at 220° C. for 60 minutes and the content of long-chain hard segments in the molecule of the polyurethane before the heat-melt treatment. That is, the term means the retention ratio of long-chain hard segments after the heat-melt treatment, and this ratio can be determined by a method to be described in detail in the Examples given later.

It is necessary that the polyurethane used in the invention have a retention of long-chain hard segments when heat melted of at least 80%. It is more desirable that the ratio be at least 85%. With this ratio being less than 80%, the polyurethane is inferior in resistance to abrasion melting and other mechanical properties.

The hard segment content of a polyurethane is determined by a method which comprises hydrolyzing a film, sheet or composition of the polyurethane by treatment with an alkali or the like that can cleave the ester bonds present in the polyurethane molecules and then recovering as a water-insoluble residue, each of fragments of the hard segments having urethane bonds formed by reaction of the organic diisocyanate and chain extender and/or reaction of the organic diisocyanate and the terminal diol of the polymeric diol, and then subjecting the water-insoluble residue to gel permeation chromatography, to analyze each fragment of the hard segments for every number of bonded segments. The "long-chain hard segment content" in the present invention is determined as a ratio between the long-chain hard segment fragments and the total amount of hard segment fragments.

The concrete procedure for the above determination of hard segment content in a polyurethane is as follows. The ester bonds present in the polyurethane molecules are cleaved (hydrolyzed) by contacting a sheet, film or composition of the polyurethane with a small amount of tetrahydrofuran to swell the polyurethane, then the swollen polyurethane is immersed in a 0.01N sodium hydroxide solution in methanol at 50° C. for 5 days and the mixture formed after the hydrolysis is placed in water to recover water-insoluble hard segments.

FIG. 1 is a chart showing the distribution of the hard segments present in the polyurethane obtained in one of the Examples (Example 3). The chart was obtained by subjecting to gel permeation chromatography the water-insoluble hard segment fragments (residue) obtained by alkali hydrolysis of the ester bonds present in the polyurethane. In FIG. 1, the substance of each hard segment is as shown in Table 1 below. Here, in the Table 1, since with hard segments having at least 3 bonds (m≧3) the corresponding peaks were not clearly separated in the chart, they are summarized and given in the column for n≧3.

TABLE 1

| Number of n | Substance of hard segment |
| --- | --- |
| n = 0 | A-MDI-A |
| n = 1 | A-(MDI-B)$_1$-MDI-A |
| n = 2 | A-(MDI-B)$_2$-MDI-A |
| n ≧ 3 | A-(MDI-B)m-MDI-A (m ≧ 3) | where: MDI=urethane bond unit originating from 4,4'-diphenylmethane diisocyanate,
A=HO—(CH$_2$)$_9$—O—,
B=—O—(CH$_2$)$_4$—O—, Further in the present invention, it is desirable, on producing a polyurethane from the above polymeric diol (a), organic diisocyanate (b)m, chain extender (c) and, as desired, other components, to use a tin compound having catalytic activity for urethanization (hereinafter referred to as "tin-based urethanization catalyst"), which causes a rapid increase of the molecular weight of the polyurethane, thereby improving the resistance of the polyurethane to abrasion and abrasion melting to a higher level. In this case, it is desirable to add the tin-based urethanization catalyst in an amount of 0.3 to 15 ppm (in terms of tin atom), particularly 0.5 to 10 ppm, based on the weight of the resulting polyurethane, i.e. on the total weight of reactive raw materials including the polymeric diol (a), organic diisocyanate (b) and chain extender (c).

Examples of usable tin-based urethanization catalysts are tin acylates and tin mercaptocarboxylic acid salts, e.g. tin octylate, monomethyltin mercaptoacetate, monobutyltin triacetate, monobutyltin monooctylate, monobutyltin maleic acid benzyl ester salt, monooctyltin tris(isooctyltin glycolic acid ester), monophenyltin triacetate, dimethyltin maleic acid ester salt, dimethyltin bis(3-mercaptopropionic acid) salt, dimethyltin bis (isooctylmercaptoacetate), dibutyltin diacetate, dibutyltin dioctoate, dibutyltin distearate, dibutyltin dilaurate, dibutyltin maleic acid salt, dibutyltin maleic acid salt polymer, dibutyltin bis(mercaptoacetic acid alkyl ester) salts, dibutyltin bisoctylthioglycolic acid ester salt, dibutyltin(3-mercaptopropionic acid) salt, dibutyltin bis(3-mercaptopropionic acid alkoxybutyl esters), dioctyltin maleic acid salt, dioctyltin maleic acid ester salt, dioctyltin maleic acid salt polymer, diocyltin laurate, dioctyltin bis (isooctylmercaptoacetate), dioctyltin bis (3-mercaptopropionic acid). These tin-based urethanization catalysts may be used singly or in combination of 2 or more.

Among the above tin-based urethanization catalysts, dibutyltin diacetate, dibutyltin dilaurate and like dialkyltin diacylates and dibutyltin bis(3-mercaptopropionic acid ethoxybutyl ester) salt and like dialkyltin bismercaptocarboxylic acid ester salts are preferred.

Use of the above tin-based urethanization catalysts either alone or in combination of 2 or more upon reaction of a polymeric diol (a), organic diisocyanate (b), chain extender (c) and as necessary other components realizes the polyurethane composition of the present invention, which contains the tin-based urethanization catalyst and has still better resistance to abrasion and abrasion melting.

In the present invention, if necessary, there may be added during or after polymerization various additives generally used on producing polyurethanes, such as heat stabilizer, antioxidant, light stabilizer, flame retardant, lubricant, color, hydrolysis preventing agent and mildew resistant agent; various organic and/or inorganic fibers, such as glass fibers and organic fibers; talc, silica and other inorganic fillers; various coupling agents and the like, as well as oxazoline, epoxy, carbodiimide and like compounds.

There are no specific restrictions with respect to the process for producing the polyurethanes usable in the invention and known urethanization processes using the above polymeric diol (a), organic diisocyanate (b), chain extender (c) and, as necessary, other components are available with either one of the prepolymer process and one-shot process. Among the known processes, continuous melt polymerization with an extruder (preferably a multi-screw extruder) in the absence of organic solvents is preferred in view of operatability on polymerization and the properties of the resulting polyurethane. With this process for producing polyurethanes with an extruder, it is recommended to feed these components at the same time or at nearly the same time to the extruder and conducting continuous melt polymerization at 190° to 280° C. preferably 200° to 260° C. to produce the polyurethanes and then cut the extrudates into pellets, chips or the like shapes.

In the present invention, it is necessary that the polyurethane thus obtained have an inherent viscosity as determined by measurement on a 0.5 g/l solution in dimethyl-formamide at 30° C. of at least 0.9 dl/g. The inherent viscosity is preferably at least 1.1 dl/g. With the inherent viscosity being less than 0.9 dl/g, the above-described properties of the polyurethanes decrease to a large extent.

The polyurethane thus obtained can be formed into the laminate of the present invention comprising a polyurethane layer and a fibrous base layer. The laminate is produced by heat melting the polyurethane and laying the melt on the fibrous base layer. On lamination of the polyurethane layer on the fibrous base layer, embossing the surface of the polyurethane layer with a grain, pear-skin or like patterns can provides the laminate with good appearance, hand, tactility and like characteristics resembling those of natural leather and is hence desirable.

Examples of the process for producing the laminate of the present invention include, but not limited thereto:

(1) a process which comprises melt extruding or casting the polyurethane on a release paper into a film, transferring the polyurethane film layer onto the fibrous base and, at the same time, adhere it thereto and solidify, while permitting the release paper or the press roll or plate to form such a pattern as to generate the desired grain or pear-skin pattern on the surface of the polyurethane;

(2) one which comprises melt extruding or casting into film the polyurethane onto a press roll having on the surface thereof such a pattern as to generate the desired grain or pear-skin pattern on the surface of the polyurethane and transferring the polyurethane film layer from the press roll to the fibrous body and adhere thereto and solidify it; and (3) one which comprises melt extruding or casting the polyurethane directly onto the fibrous base into a layer to form a polyurethane layer on the fibrous base layer and, during a time period before solidification of the polyurethane, pressing the polyurethane against a release paper or press roll or plate having a roughened surface to form the corresponding grain, pear-skin or like patterns on the surface of the polyurethane layer.

On carrying out these processes, the fibrous layer surface may be previously coated or impregnated with an adhesive or like adhesion improving agents, in order to obtain firm adhesion between the polyurethane layer and the fibrous base layer.

The polyurethane layer provided on the surface of the fibrous base layer preferably has a thickness of 10 to 800 $\mu$m, more preferably 30 to 500 $\mu$m, to provide the resulting laminate with good resistance to abrasion and scratching, high mechanical properties, good water resistance and cold resistance and like properties, without deteriorating the softness and flexibility. If the polyurethane layer is too thin, the laminate will have insufficient resistance to abrasion and scratching and poor adhesion between the polyurethane layer and fibrous base layer. On the other hand, if the polyurethane layer is too thick, the laminate will have insufficient softness and flexibility and tend to have poor appearance, hand and tactility.

As the fibrous base layer constituting the laminate of the present invention, there may be used any of those comprising woven, knit and nonwoven fabrics or integrated laminates of the foregoing used for conventional synthetic or artificial leathers. It is recommended that the fibrous base be formed of a natural fiber such as cotton, hemp or wool, a regenerated fiber such as rayon or acetate fiber or a synthetic fiber such as nylon, polyvinyl alcohol fiber, polyester fibers, acrylic fibers, polyolefin fibers or polyurethane fibers, either alone or in combination of 2 or more.

In order to provide the laminate with a suppleness resembling that of natural leather, it is desirable to use, as fibers constituting the fibrous base, ultrafine fibers having a fineness of not more than 0.3 denier, preferably not more than 0.1 denier. In this case it is further desirable that the ultrafine fibers assume the form of collected fibers or fibers having a multiplicity of pores in the direction of fiber axis, i.e. what is known as multi-porous fibers. These ultrafine fibers can be obtained by, for example, the following processes. (1) A process which comprises preparing polymer blended fibers or composite fibers by blend- or composite-spinning a mixture of at least 2 polymers having different solubility in a solvent into sea-islands- or split-type fibers and then removing the more readily soluble polymer by extraction with the solvent; (2) one which comprises preparing polymer blended fibers or composite fibers by blend- or composite-spinning a mixture of at least 2 polymers having different decomposability in a decomposing agent into sea-islands- or split-type fibers and then removing the more readily decomposable polymer by decomposition with the decomposing agent; and (3) one which comprises preparing polymer blended fibers or composite fibers by blend- or composite-spinning a mixture of at least 2 polymers having poor compatibility with each other into sea-islands or split-type fibers and then subjecting the fibers to mechanical or chemical fibrillation treatment to cause separation at the interfaces between the polymers.

More concretely, these ultrafine fibers can be obtained, for example, by preparing polymer blended fibers or composite fibers by blend- or composite-spinning a mixture of nylon or a polyester with polystyrene and then extracting the polystyrene with toluene, or by preparing polymer blended fibers or composite fibers by blend- or composite-spinning a mixture of a polyester and polyethylene then extracting the polyethylene with decalin or the like. However, the fibrous base may also be formed, not of ultrafine fibers, of conventional fibers having a fineness of about 0.3 to 5 deniers.

The thickness of the fibrous base layer can be suitably adjusted according to the use of the laminate, and is generally about 0.5 to 5 mm, preferably about 1 to 2 mm, in view of the softness, flexibility, tactility and like properties of the resulting laminate.

To provide the laminate with natural leather-like hand, the fibrous body may be impregnated with a polyurethane elastomer or similar elastic polymers. In this case, the impregnation with an elastic polymer having a porous structure can provides the resulting laminate having a hand still closer to that of natural leather. To impregnate the fibrous body with the elastic polymer such as polyurethane elastomer with a porous structure, there can be employed, for example, a process which comprises impregnating the fibrous base with a solution of the elastic polymer and then wet coagulating the solution. With the fibrous body being impregnated with an elastic polymer such as polyurethane elastomer, the adhesion between the fibrous base layer and a polyurethane layer provided thereon becomes more firm.

The fibrous base may, to increase adhesiveness to the polyurethane layer and/or to achieve a suede-like appearance, have a napped surface or roughened surface, on one or both side. Further the fibrous base may be coated, on one or both surface thereof and before formation of the polyurethane layer, with a porous and/or non-porous coating layer. The surface of this coating layer may as necessary be roughened with sand paper or like means or by pressing with a gravure roll. This type of coating layer may be formed, on one or both surface of the fibrous base, as a continuous layer or as discontinuous layers.

Accordingly, as described above, with the laminate of the present invention, a layer of the above specific polyurethane obtained from a polymeric diol (a), organic diisocyanate (b) and chain extender (c) may be provided either directly on a fibrous base layer or via a coating layer.

Further with the laminate of the present invention, the layer of the above specific polyurethane may be provided either on one surface alone or on both surfaces of the fibrous base layer, or on one or both surfaces and at the same time amid the fibrous base layer (that is, the polyurethane layer and the fibrous layer may be present alternately in at least 3 total layers). The construction of the laminate can thus be suitably selected according to the use.

The total thickness of the laminate of the present invention can be suitably set according to the use and the like of the laminate, and is generally about 0.5 to 5 mm, more preferably about 1 to 2 mm, in view of softness, flexibility, mechanical properties, durability and the like.

The laminates according to the present invention thus obtained and comprising a thermoplastic polyurethane layer and a fibrous base layer, which are excellent in softness, flexibility, tactility and mechanical properties such as tensile strength, as well as in abrasion resistance, durability, cold resistance and like properties, are effectively usable for apparel, sporting goods, shoes, bags and similar containers, boxes, interiors for building including houses, decorative sheets for furniture and other purposes.

Further in the present invention, the polyurethanes obtained from the above polymeric diol (a), organic diisocyanate (b), chain extender (c) and, as necessary, other components may be formed, by melt extrusion, casting or like processes, into films or sheets with no fibrous base. Accordingly, the present invention also includes such polyurethane films or sheets. The polyurethane films or sheets according to the present invention may, as necessary, be provided with a grain or like patterns or pear-skin patterns. The thickness of these polyurethane films or sheets can be suitably set according to their intended uses and is generally in a range of 10 to 800 μm.

The polyurethane films or sheets according to the present invention, which are excellent in resistance to abrasion and abrasion melting, softness, flexibility, tactility, mechanical properties, cold resistance, durability and like properties, are effectively usable for toe-guards of shoes, mackintoshes, bags and like items.

The above polyurethane composition produced with a tin-based urethanization catalyst is, utilizing the above excellent characteristic, in particular excellent resistance to abrasion and abrasion melting, used for the production of the above laminate and polyurethane films or sheets and, besides, can also be used for the same purposes as those of known thermoplastic polyurethanes (e.g. fibers, bumpers, tubes, hoses, belts, boots and like molded articles).

EXAMPLES

Other features of the invention will become apparent in the course of the following descriptions of exemplary embodiments which are given for illustration of the invention and are not intended to be limiting thereof. In the Examples and Comparative Examples that follow the crystallization enthalpy ($\Delta H$) of polymeric diol and the inherent viscosity, retention of long-chain hard segments when heat melted, abrasion resistance (Taber abrasion resistance), resistance to abrasion melting, and the bleed out/whitening of polyurethane were tested or evaluated according to the following methods. [Crystallization enthalpy ($\Delta H$) of polymeric diol]

The melting enthalpy ($\Delta H$) of a polymeric diol sample was determined with a differential scanning calorimeter (RIGAKU THERMAL ANALYSIS STATION-TAS100, made by Rigaku Denki K.K.) and taken as the crystallization enthalpy ($\Delta H$). On the testing, an about 10-mg sample was subjected to the succes-sive steps of 1. heating the sample from room temperature to 100° C. at a temperature elevation rate of 100° C./min and then maintaining it at 100° C. for 3 minutes, 2. cooling the sample from 100° C. to –100° C. at a temperature decreasing rate of 10° C./min and maintaining it at –100° C. for 1 minute, and 3. heating the sample from –100° C. to 100° C. at a temperature elevation rate of 100° C./min and then maintaining it at 100° C. for 0 minute. The melting enthalpy (crystallization enthalpy) ($\Delta H$) was obtained from the peak area in step 3.

[Inherent viscosity of polyurethane]

A polyurethane sample (film molded from polyurethane or the polyurethane layer of a laminate of a polyurethane layer and a fibrous base layer) was dissolved in N,N-dimethylformamide to a concentration of 0.5 g/dl. 24 hours after the dissolution, the viscosity of the solution was measured with an Ubbelohde viscometer and the inherent viscosity was obtained by the following formulas.

$$\eta_{rel} = t/t_0$$

$$\eta_{inh} = ln(\eta_{rel})/c$$

where t=flow down time (seconds) of solution, $t_0$=flow down time (seconds) of solvent, $\eta_{rel}$=specific viscosity, $\eta_{inh}$=inherent viscosity, c=concentration of polyurethane.

[Retention of long-chain hard segments when heat melted]
Long-chain hard segment content To a 2-g polyurethane sample taken from a laminate comprising a polyurethane layer and a fibrous base layer or from a melt molded polyurethane film, there was added 5 ml of tetrahydrofuran to swell the sample. After 2 hours, 25 ml of 0.01N sodium hydroxide solution in methanol was added and the mixture was stirred at 50° C. for 5 days to hydrolyze the polyurethane by cleaving its ester bonds. The solvent was evaporated off at 50° C. in 2 hours and the residue was placed in 1,000 ml of water and then filtered with a filter paper. The residue was constituted of compounds originating from hard segments. After the compounds had been sufficiently dried, 0.020-g specimen was weighed out therefrom and dissolved by addition of 2.0 ml of N-methylpyrrolidone and 6.0 ml of tetrahydrofuran. The solution obtained was subjected to gel permeation chromatography with the apparatus and under the conditions shown in Table 2 below.

TABLE 2

High-performance liquid chromatograph: LC-9A, made by Shimadzu Corp.
Column oven: CTO-6A, made by Shimazu Corp. (40° C.)
Differential refractometer detector: RID-6A, made by Shimadzu Corp.
Chromato Pack: C-R4A, made by Shimadzu Corp.
Columns: Shodex GPC KF-802, made by Showa Denko K.K.
Shodex GPC KF-802.5, made by Showa Denko K.K.
$20\mu$ 1 of sample was injected and the solvent (tetrahydrofuran) was flown at a rate of 1.0 ml/min.

After the test, the analysis was carried out by obtaining the area between the elution curve and base line, while treating incompletely separable peaks by vertical splitting as shown in FIG. 1. With polyurethanes from, as a chain extender or organic diisocyanate, a mixture of least 2 compounds, the obtained peaks often have shoulder part, which, however, generally does not hinder the splitting treatment. In this manner, compounds originating from "long-chain hard segments" containing at least 3 repeating units comprising those having urethane bond formed by addition of one organic diisocyanate and one chain extender or those comprising one organic diisocyanate, i.e. hard segments were determined. The long-chain hard segment content (% by weight) was determined as a GPC areal ratio between the long-chain hard segments and total hard segments.

[Retention of long-chain hard segments when heat melted]

A 60-g polyurethane sample taken from a laminate comprising a polyurethane layer and a fibrous base layer or from a melt molded polyurethane film was vacuum dewatered at 90° C. for 3 hours and heat kneaded at 220° C. for 60 minutes under a nitrogen atmosphere in a molten state. The heat melted polyurethane was then tested for the long-chain hard segment content by the above method. The ratio (%) between the obtained long-chain hard segment content and that before the kneading (heat melting) was calculated as the retention of long-chain hard segments.

[Abrasion resistance (Taber abrasion resistance) of polyurethane]

Tested in accordance with JIS K7204. That is, a specimen having a diameter of 12 cm was cut out from a laminate or melt molded film of polyurethane. An abrasion ring (H-22) was applied to the circular specimen (on the polyurethane layer side for laminate sample) and abrasion test was conducted by rotating the circular specimen by 1,000 rotations at a load of 1 kgf. The weight of the specimen after the abrasion test was subtracted from that before the test, and the amount (g) worn (the weight reduced by abrasion) was calculated.

[Resistance to abrasion melting]

A specimen strip (3 cm×6 cm) was cut out from a laminate or melt molded film of polyurethane. The specimen was pressed against a cherry roll (diameter: 73 mm, width: 26 mm) rotating at 1,800 rpm under a load of 1.51 lb for 2 seconds. After the test, the abrasion-melted area ($cm^2$) of the specimen was measured and, also, the state of abrasion-melted surface was visually checked and evaluated in terms of the rating shown in Table 3.

TABLE 3

| Rank | Abrasion melted area |
|---|---|
| 5 | Less than 1 $cm^2$ |
| 4 | More than 1 $cm^2$ and not more than 2 $cm^2$ |
| 3 | More than 2 $cm^2$ and not more than 3 $cm^2$ |
| 2 | More than 3 $cm^2$ and not more than 4 $cm^2$ |
| 1 | More than 4 $cm^2$ |
| Rank | State of abrasion melted surface |
| ○ | Good, with little abrasion melting |
| Δ | Fair, with a little abrasion melting |
| X | Poor, with severe abrasion melting |

[Bleed out/whitening of polyurethane]

A sample of laminate or melt molded film of polyurethane was continuously heated at 80° C. for 1 week. After the heating, the appearance of the sample was visually checked and evaluated in terms of the following rating.

○: No bleed out/whitening
x: Slight bleed out/whitening
x x: Considerably severe bleed out/whitening
x x x: Marked bleed out/whitening In the following Reference Examples, Examples and Comparative Examples, the compounds used are expressed by the codes as shown in Table 4.

TABLE 4

| Code | Compound |
|---|---|
| BD | 1,4-Butanediol |
| EG | Ethylene glycol |
| HD | 1,6-Hexanediol |
| MPD | 3-Methyl-1,5-pentanediol |
| MOD | 2-Methyl-1,8-octanediol |
| ND | 1,9-Nonanediol |
| Ad | Adipic acid |
| IPA | Isophthalic acid |
| TPA | Terephthalic acid |
| EC | Ethylene carbonate |
| PNOA | Polyester diol obtained from ND, MOD and Ad |
| PNMA | Polyester diol obtained from ND; MPD and Ad |
| PNIA | Polyester diol obtained from ND, IPA and Ad |
| PNTA | Polyester diol obtained from ND, TPA and Ad |
| PNMC | Polycarbonate diol obtained from ND, MPD and EC |
| PMPA | Polyester diol obtained from MPD and Ad |
| PEA | Polyester diol obtained from EG and Ad |
| PBA | Polyester diol obtained from BD and Ad |
| PHA | Polyester diol obtained from HD and Ad |
| PNA | Polyester diol obtained from ND and Ad |
| MDI | 4,4'-Diphenylmethane diisocyanate |
| DBA | Dibutyltin diacetate |

Reference Example 1

[Preparation of PNOA2000]

A reaction vessel was charged with 4,717 g of ND, 3,145 g of MOD and 6,751 g of Ad and esterification was conducted at 200° C. under atmospheric pressure while water that formed was being distilled off. When the acid value of the reaction mixture became not more than 30, 90 mg of tetraisopropyl titanate was added and the reaction was continued while the pressure was reduced to 200 to 100 mmHg. When the acid value became 1.0, the degree of vacuum was gradually increased by vacuum pump to complete the reaction. As a result, 13,150 g of a PNOA having a number average molecular weight of 2,000 and a molar ratio of ND/MOD of 6/4 (hereinafter this PNOA is referred to as "PNOA-A").

Reference Example 2
[Preparation of PNOA with deactivated titanium-based urethanization catalyst]

A 5,000-g fraction of the PNOA-A obtained in Reference Example 1 was heated to 100° C. and 150 g (3% by weight) of water was added. The mixture was heated with stirring for 2 hours, to deactivate the titanium-based catalyst. The water was distilled off from the resulting mixture, to obtain a PNOA with the titanium-based catalyst having been deactivated (hereinafter this PNOA is referred to as "PNOA-B").

Reference Example 3
[Preparation of PNOA to which a tin-based urethanization catalyst has been added]

A 5,000-g fraction of the PNOA-B obtained in Reference Example 2 was heated to 100° C. and dibutyltin diacetate (DBA) as a tin-based urethanization catalyst compound was added in an amount of 6 ppm (2.0 ppm in terms of tin atom). The mixture was stirred for 1 hour, to give a PNOA with which the titanium-based catalyst had been deactivated and then a tin-based urethanization catalyst compound added (hereinafter this PNOA is referred to as "PNOA-C").

Reference Example 4
[Preparation of PNMA3000]

A reaction vessel was charged with 3,098 g of MPD, 4,200 g of ND and 6,716 g of Ad and esterification and polycondensation were effected in the same manner as in Reference Example 1, to obtain 12,100 g of a PNMA having a number average molecular weight of 3,000 and a molar ratio of ND/MPD of 5/5. The PNMA was subjected to deactivation treatment of the titanium-based catalyst and had the water distilled off under reduced pressure, in the same manner as in Reference Example 2. To the obtained PNMA, 10 ppm (3.4 ppm in terms of tin atom) of dibutyltin diacetate (DBA) was added in the same manner as in Reference Example 3, to obtain a PNMA with which the titanium-based catalyst had been deactivated and then a tin-based urethanization catalyst compound added (hereinafter this PNMA is referred to as "PNMA-A").

Reference Example 5
[Preparation of PNMA2000]

A reaction vessel was charged with 3,747 g of MPD, 4,520 g of ND and 7,300 g of Ad and esterification and polycondensation were effected in the same manner as in Reference Example 1, to obtain 13,350 g of a PNMA having a number average molecular weight of 2,000 and a molar ratio of ND/MPD of 5/5. The PNMA was subjected to deactivation treatment of the titanium-based catalyst and had the water distilled off under reduced pressure, in the same manner as in Reference Example 2. To the obtained PNMA, 10 ppm (3.4 ppm in terms of tin atom) of dibutyltin diacetate (DBA) was added in the same manner as in Reference Example 3, to obtain a PNMA with which the titanium-based catalyst had been deactivated and then a tin-based urethanization catalyst compound added (hereinafter this PNMA is referred to as "PNMA-B").

Reference Example 6
[Preparation of PNIA3000]

A reaction vessel was charged with 7,594 g of ND, 2,052 g of IPA and 4,211 g of Ad and esterification and polycondensation were effected in the same manner as in Reference Example 1, to obtain 12,400 g of a PNIA having a number average molecular weight of 3,000 and a molar ratio of IPA/Ad of 3/7. The PNIA was subjected to deactivation treatment of the titanium-based catalyst and had the water distilled off under reduced pressure, in the same manner as in Reference Example 2, to obtain a PNIA with which the titanium-based catalyst had been deactivated (hereinafter this PNMA is referred to as "PNIA-A").

Reference Example 7
[Preparation of PNIA to which a tin-based urethanization catalyst has been added]

The PNIA-A obtained in Reference Example 6 was used and dibutyltin diacetate (DBA) as a tin-based urethanization catalyst compound was added in an amount of 12 ppm (4.1 ppm in terms of tin atom) in the same manner as in Reference Example 3, to obtain a PNIA with which the titanium-based catalyst had been deactivated and then a tin-based urethanization catalyst compound added (hereinafter this PNIA is referred to as "PNIA-B").

Reference Example 8
[Preparation of PNIA to which a tin-based urethanization catalyst has been added]

The PNIA-A obtained in Reference Example 6 was used and dibutyltin diacetate (DBA) as a tin-based urethanization catalyst compound was added in an amount of 0.3 ppm (0.1 ppm in terms of tin atom) in the same manner as in Reference Example 3, to obtain a PNIA with which the titanium-based catalyst had been deactivated and then a tin-based urethanization catalyst compound added (hereinafter this PNIA is referred to as "PNIA-C").

Reference Example 9
[Preparation of PNIA to which a tin-based urethanization catalyst has been added]

The PNIA-A obtained in Reference Example 6 was used and dibutyltin diacetate (DBA) as a tin-based urethanization catalyst compound was added in an amount of 50 ppm (17.0 ppm in terms of tin atom) in the same manner as in Reference Example 3, to obtain a PNIA with which the titanium-based catalyst had been deactivated and then a tin-based urethanization catalyst compound added (hereinafter this PNIA is referred to as "PNIA-D").

Reference Example 10
[Preparation of PNIA1200]

A reaction vessel was charged with 4,520 g of ND, 946 g of IPA and 1,942 g of Ad and esterification and polycondensation were effected in the same manner as in Reference Example 1, to obtain 5,980 g of a PNIA having a number average molecular weight of 1,200 and a molar ratio of IPA/Ad of 3/7. The PNIA was subjected to deactivation treatment of the titanium-based catalyst and had the water distilled off under reduced pressure, in the same manner as in Reference Example 2. To the obtained PNIA, 6 ppm (2.0 ppm in terms of tin atom) of dibutyltin diacetate (DBA) was added in the same manner as in Reference Example 3, to obtain a PNIA with which the titanium-based catalyst had been deactivated and then a tin-based urethanization catalyst compound added (hereinafter this PNIA is referred to as "PNIA-E").

Reference Example 11
[Preparation of PNTA3000]

A reaction vessel was charged with 7,526 g of ND, 2709 g of TPA and 3,574 g of Ad and esterification and polycondensation were effected in the same manner as in Reference Example 1, to obtain 12,350 g of a PNTA having a number average molecular weight of 3,000 and a molar ratio of TPA/Ad of 4/6. The PNTA was subjected to deactivation treatment of the titanium-based catalyst and had the water distilled off under reduced pressure, in the same manner as in Reference Example 2. To the obtained PNTA, 12 ppm (4.1 ppm in terms of tin atom) of dibutyltin diacetate (DBA) was added in the same manner as in Reference Example 3, to obtain a PNTA with which the titanium-based catalyst had been deactivated and then a tin-based urethanization catalyst compound added (hereinafter this PNTA is referred to as "PNTA-A").

Reference Example 12
[Preparation of PNMC3000]
There was used as a reaction apparatus a 10-1 three neck flask equipped with a Vigreaux fractionating column (65φ× 1,500 mm) equipped on its top with a cooler via a layer column, a stirrer and a dropping funnel.

The flask was charged with 1,650 g of MPD, 3,360 g of ND and 1,450 g of pseudocumene and the mixture was, with stirring at 500 rpm, heated in an oil bath at 205° C. When the solvent pseudocumene started refluxing at a rate of about 5 kg/h in the layer column on the top of the fractionating column (the maximum retention of pseudocumene here is 270 g) and cooler, 880 g of EC was added through the dropping funnel in a lump and further 880 g of EC was, in a melted state, added over 3 hours. During this period, the solvent refluxed at a rate of about 5 kg/h and ethylene glycol formed by reaction of EC and accummulated by azeotropy with pseudocumene was withdrawn from time to time. The reaction was permitted to continue after completion of addition of EC and, when the reaction rate of EC reached 90% (after 6 hours), 15 ppm of an esterification catalyst of tetraisopropyl titanate was added. Then the pseudocumene was distilled off under atmospheric pressure and 100 mmHg. At that time, the reaction mixture showed an acid value of not more than 0. and the reaction rate of EC had reached 100%. After all the pseudocumene had been distilled off, the excess MPD and ND were distilled off under 1 mmHg, to obtain a PNMC having a number average molecular weight of 3,000 and a molar ratio of ND/MPD of 6/4.

The PNMC thus obtained was subjected to deactivation treatment of the titanium-based catalyst and had the water distilled off under reduced pressure, in the same manner as in Reference Example 2. To the obtained PNMC, 12 ppm (4.1 ppm in terms of tin atom) of dibutyltin diacetate (DBA) was added in the same manner as in Reference Example 3, to obtain a PNMC with which the titanium-based catalyst had been deactivated and then a tin-based urethanization catalyst compound added (hereinafter this PNMC is referred to as "PNMC-A").

Reference Example 13
[Preparation of PEA2000]
A reaction vessel was charged with 3,203 g of EG and 6,599 g of Ad and esterification and polycondensation were effected in the same manner as in Reference Example 1, to obtain 8,150 g of a PEA having a number average molecular weight of 2,000. The PEA was subjected to deactivation treatment of the titanium-based catalyst and had the water distilled off under reduced pressure, in the same manner as in Reference Example 2, to give a PEA with which the titanium-based catalyst had been deactivated (hereinafter this PEA is referred to as "PEA-A").

Reference Example 14
[Preparation of PEA2000 to which a tin-based urethanization catalyst has been added]
To the PEA obtained in Reference Example 13, 6 ppm (2.0 ppm in terms of tin atom) of dibutyltin diacetate (DBA) was added in the same manner as in Reference Example 3, to obtain a PEA with which the titanium-based catalyst had been deactivated and then a tin-based urethanization catalyst compound added (hereinafter this PEA is referred to as "PEA-B").

Reference Example 15
[Preparation of PBA2000]
A reaction vessel was charged with 4,026 g of BD and 5,636 g of Ad and esterification and polycondensation were effected in the same manner as in Reference Example 1, to obtain 8,190 g of a PBA having a number average molecular weight of 2,000. The PBA was subjected to deactivation treatment of the titanium-based catalyst and had the water distilled off under reduced pressure, in the in Reference E in Reference Example 2, to give a PBA with which the titanium-based catalyst had been deactivated (hereinafter this PBA is referred to as "PBA-A").

Reference Example 16
[Preparation of PHA2000]
A reaction vessel was charged with 4,609 g of HD and 4,847 g of Ad and esterification and polycondensation were effected in the same manner as in Reference Example 1, to obtain 8,200 g of a PHA having a number average molecular weight of 2,000. The PHA was subjected to deactivation treatment of the titanium-based catalyst and had the water distilled off under reduced pressure, in the same manner as in Reference Example 2, to give a PHA with which the titanium-based catalyst had been deactivated (hereinafter this PHA is referred to as "PHA-A").

Reference Example 17
[Preparation of PNA2000]
A reaction vessel was charged with 7,862 g of HD and 6,751 g of Ad and esterification and polycondensation were effected in the same manner as in Reference Example 1, to obtain 8,210 g of a PNA having a number average molecular weight of 2,000. The PNA was subjected to deactivation treatment of the titanium-based catalyst and had the water distilled off under reduced pressure, in the same manner as in Reference Example 2, to give a PNA with which the titanium-based catalyst had been deactivated (hereinafter this PNA is referred to as "PNA-A").

Reference Example 18
[Preparation of PMPA2000]
A reaction vessel was charged with 4,609 g of MPD and 4,847 g of Ad and esterification and polycondensation were effected in the same manner as in Reference Example 1, to obtain 8,150 g of a PMPA having a number average molecular weight of 2,000. The PMPA was subjected to deactivation treatment of the titanium-based catalyst and had the water distilled off under reduced pressure, in the same manner as in Reference Example 2. To the PMPA thus treated, 6 ppm (2.0 ppm in terms of tin atom) of dibutyltin diacetate (DBA) was added in the same manner as in Reference Example 3, to obtain a PMPA with which the titanium-based catalyst had been deactivated and then a tin-based urethanization catalyst compound added (hereinafter this PMPA is referred to as "PMPA-A"). The PMPA-A was found to be amorphous.

Reference Example 19
[Preparation of PNMA5000]
A reaction vessel was charged with 3,646 g of MPD, 4,944 g of ND and 8,541 g of Ad and esterification and polycondensation were effected in the same manner as in Reference Example 1, to obtain 14,500 g of a PNMA having a number average molecular weight of 5,000 and a molar ratio of ND/MPD of 5/5. The PNMA was subjected to deactivation treatment of the titanium-based catalyst and had the water distilled off under reduced pressure, in the same manner as in Reference Example 2. To the PNMA thus treated, 10 ppm (3.4 ppm in terms of tin atom) of dibutyltin diacetate (DBA) was added in the same manner as in Reference Example 3, to obtain a PNMA with which the titanium-based catalyst had been deactivated and then a tin-based urethanization catalyst compound added (hereinafter this PNMA is referred as "PNMA-C").

The polymeric diols (polyester diols and a polycarbonate diol) obtained in the above Reference Examples 1 through 19 were tested for crystallization enthalpy (ΔH) by the method described above. Table 5 shows the results, as well as the particulars of the polymeric diols.

melting zone 50 parts by weight of a sea component of polyethylene and 50 parts by weight of an islands component of 6-nylon. The obtained composite filaments were drawn in a ratio of 3.0, provided with crimps and cut to a fiber length of 51 mm. The fibers were carded and then formed into a web through a cross-lapper. The web was needle-punched into a fiber-entangled nonwoven fabric having a weight of 650 g/m$^2$. The nonwoven fabric thus obtained was impregnated with a solution of 13 parts by weight of a polyurethane composition consisting essentially of a polyether-based polyurethane and 87 parts by weight of dimethylformamide. The obtained body was subjected to the successive steps of coagulation, washing with water and removal of the polyethylene in the composite fibers by extraction with toluene, to give a fibrous base having a

TABLE 5

| | | Raw materials | | Properties of polymeric diol | | | |
|---|---|---|---|---|---|---|---|
| Ref. Ex. | Code | Dicarboxylic acid (molar ratio) | Diol (molar ratio) | Number ave. molecular weight | ΔH (J/g) | Deactivation of Ti-cat. | Amount of Sn-catalyst (ppm of Sn atom) |
| 1 | PNOA-A | Ad | ND/MOD = 6/4 | 2,000 | 65.1 | no | — |
| 2 | PNOA-B | Ad | ND/MOD = 6/4 | 2,000 | 65.1 | yes | — |
| 3 | PNOA-C | Ad | ND/MOD = 6/4 | 2,000 | 65.1 | yes | 2.0 |
| 4 | PNMA-A | Ad | ND/MPD = 5/5 | 3,000 | 46.7 | yes | 3.4 |
| 5 | PNMA-B | Ad | ND/MPD = 5/5 | 2,000 | 45.0 | yes | 3.4 |
| 6 | PNIA-A | IPA/Ad = 3/7 | ND | 3,000 | 60.0 | yes | — |
| 7 | PNIA-B | IPA/Ad = 3/7 | ND | 3,000 | 60.0 | yes | 4.1 |
| 8 | PNIA-C | IPA/Ad = 3/7 | ND | 3,000 | 60.0 | yes | 0.1 |
| 9 | PNIA-D | IPA/Ad = 3/7 | ND | 3,000 | 60.0 | yes | 17.0 |
| 10 | PNIA-E | IPA/Ad = 3/7 | ND | 1,200 | 52.2 | yes | 2.0 |
| 11 | PNTA-A | TPA/Ad = 4/6 | ND | 3,000 | 65.2 | yes | 4.1 |
| 12 | PNMC-A[1)] | EC | ND/MPD = 6/4 | 3,000 | 55.0 | yes | 4.1 |
| 13 | PEA-A | Ad | EG | 2,000 | 66.8 | yes | — |
| 14 | PEA-B | Ad | EG | 2,000 | 66.8 | yes | 2.0 |
| 15 | PBA-A | Ad | BD | 2,000 | 76.9 | yes | — |
| 16 | PHA-A | Ad | HD | 2,000 | 88.2 | yes | — |
| 17 | PNA-A | Ad | ND | 2,000 | 90.1 | yes | — |
| 18 | PMPA-A | Ad | MPD | 2,000 | —[2)] | yes | 2.0 |
| 19 | PNMA-C | Ad | ND/MPD = 5/5 | 5,000 | 54.0 | yes | 3.4 |

[1)]Polycarbonate diol
[2)]Not detected

Example 1

(1) The PNOA (PNOA-C) obtained in Reference Example 3, BD and MDI melted by heating at 50° C. were continuously fed in a molar ratio of [PNOA-C]:[MDI]:[BD]= 1:3.60:2.60 as shown in Table 6 and in a total feed rate of 200 g/min through metering pumps to a same direction twin-screw extruder (30φ, L/D=36) and subjected to continuous melt polymerization at a temperature of 260° C. The thermoplastic polyurethane melt that formed was continuously extruded into water in the form of strand, which was then cut with a pelletizer into pellets. The pellets thus obtained was dehumidified and dried at 80° C. for 6 hours.

The thermoplastic polyurethane pellets thus obtained were extrusion molded (die temperature: 210° C.) into a film having a thickness of 300 μm. The film was tested or evaluated for the retention of long-chain hard segments when heat melted, abrasion resistance (Taber abrasion test), resistance to abrasion melting and bleed out/whitening by the methods described above. The results are shown in Table 7. (2) Composite filaments having a single filament fineness of 10 deniers were prepared by melt spinning in the same thickness of about 1.3 mm and consisting of an 6-nylon ultrafine fiber-bundle nonwoven fabric and the polyurethane binder.

Between the fibrous base and a press roll, the polyurethane pellets obtained in the above (1) were melt extruded at 210° C. into a film having a thickness of 300 μm, which was bonded to the fibrous base with the press roll, to obtain a laminate sheet consisting of the fibrous base layer and a layer of the polyurethane. The laminate sheet was tested or evaluated for the retention of long-chain hard segments when heat melted, abrasion resistance (Taber abrasion test), resistance to abrasion melting and bleed out/whitening state by the methods described above. The results are shown in Table 8.

Examples 2 through 8

Example 1 was repeated except that the polymeric diols, organic diisocyanate and chain extenders shown in Table 6 were used in ratios as shown, to obtain several types of polyurethane pellets, which were then formed into polyurethane films and laminate sheets consisting of the fibrous base layer and a layer of each of the polyurethanes. These films and sheets were tested or evaluated in the same manner as in Example 1. The results are shown in Table 7 (films) and Table 8 (laminate sheets).

Comparative Examples 1 through 8

Example 1 was repeated except that the polymeric diols, organic diisocyanate and chain extenders shown in Table 6 were used in ratios as shown, to obtain several types of polyurethane pellets, which were then formed into polyurethane films and laminate sheets consisting of the fibrous base layer and a layer of each of the polyurethanes. These films and sheets were tested or evaluated in the same manner as in Example 1. The results are shown in Table 7 (films) and Table 8 (laminate sheets).

Comparative Example 12

Example 1 was repeated except that the PNMA (PNMA-C) obtained in Reference Example 19 was used and that the feed ratio of raw materials was changed as shown in Table 6, to prepare pellets of a polyurethane. Attempts were made with the polyurethane pellets, to prepare a film and a laminate sheet by melt extrusion in the same manner as in Example 1. However, due to insufficient moldability, a film or a laminate sheet could not be obtained.

TABLE 6

| Example | Polymeric diol (obtained in Reference Example No.) | Chain extender composition (molar ratio) | Ratio between raw materials of polyurethane Polymeric:Chain:MDI diol extender |
|---|---|---|---|
| 1 | PNOA-C (3) | BD | 1:2.6:3.6 |
| 2 | PNMA-A (4) | BD/ND = 80/20 | 1:4.4:5.4 |
| 3 | PNIA-B (7) | BD | 1:4.4:5.4 |
| 4 | PNMA-B (5) | BD/ND = 80/20 | 1:2.6:3.6 |
| 5 | PNTA-A (11) | BD | 1:4.4:5.4 |
| 6 | PNMC-A (12) | BD/ND = 80/20 | 1:4.4:5.4 |
| 7 | PNMA-A (4) | BD/ND = 80/20 | 1:4.4:5.4 |
| 8 | PNIA-B (7) | BD | 1:4.4:5.45 |
| Comparative Example | | | |
| 1 | PNOA-B (2) | BD | 1:2.6:3.6 |
| 2 | PNOA-A (1) | BD | 1:2.6:3.6 |
| 3 | PEA-A (13) | BD | 1:2.6:3.6 |
| 4 | PEA-B (14) | BD | 1:2.6:3.6 |
| 5 | PBA-A (15) | BD | 1:2.6:3.6 |
| 6 | PHA-A (16) | BD | 1:2.6:3.6 |
| 7 | PNA-A (17) | BD | 1:2.6:3.6 |
| 8 | PMPA-A (18) | BD | 1:2.6:3.6 |
| 9 | PNIA-C (8) | BD | 1:4.4:5.4 |
| 10 | PNIA-D (9) | BD | 1:4.4:5.4 |
| 11 | PNIA-E (10) | BD | 1:0.9:1.9 |
| 12 | PNMA-C (19) | BD/ND = 80/20 | 1:7.4:8.4 |

TABLE 7

| | | Properties of polyurethane melt molded film | | | | | |
|---|---|---|---|---|---|---|---|
| | Polymeric diol (obtained in Reference Example No.) | Inherent viscosity (dl/g) | Retention of long-chain HS[1] (%) | Amount worn by Taber abrasion (mg) | Resistance to abrasion melting | | Bleed / whitening state (rank) |
| | | | | | Area abrasion melted (rank) | State of melted surface | |
| Example | | | | | | | |
| 1 | PNOA-C (3) | 1.38 | 97 | 9 | 5 | ○ | ○ |
| 2 | PNMA-A (4) | 1.39 | 97 | 10 | 5 | ○ | ○ |
| 3 | PNIA-B (7) | 1.20 | 95 | 5 | 5 | ○ | ○ |
| 4 | PNMA-B (5) | 1.39 | 95 | 9 | 5 | ○ | ○ |
| 5 | PNTA-A (11) | 1.12 | 96 | 3 | 4–5 | ○ | ○ |
| 6 | PNMC-A (12) | 1.25 | 97 | 10 | 5 | ○ | ○ |
| 7 | PNMA-A (4) | 1.78 | 97 | 7 | 5 | ○ | ○ |
| 8 | PNIA-B (7) | 1.70 | 95 | 2 | 5 | ○ | ○ |
| Comparative Example | | | | | | | |
| 1 | PNOA-B (2) | 0.86 | 96 | 29 | 3 | Δ | ○ |
| 2 | PNOA-A (1) | 1.29 | 68 | 24 | 1 | X | ○ |
| 3 | PEA-A (13) | 0.92 | 65 | 22 | 1 | X | X |
| 4 | PEA-B (14) | 1.35 | 51 | 18 | 2 | X | X |
| 5 | PBA-A (15) | 0.89 | 92 | 30 | 1 | Δ | XX |
| 6 | PHA-A (16) | 0.87 | 94 | 25 | 2 | Δ | XXX |
| 7 | PNA-A (17) | 0.82 | 96 | 27 | 2 | Δ | XXX |
| 8 | PMPA-A (18) | 1.26 | 92 | 28 | 2 | X | ○ |
| 9 | PNIA-C (8) | 0.86 | 94 | 11 | 2 | X | ○ |
| 10 | PNIA-D (9) | 1.45 | 70 | 11 | 2 | Δ | ○ |
| 11 | PNIA-E (10) | 1.32 | 91 | 12 | 1 | Δ | ○ |

[1]Retention of long-chain hard segments when heat melted.

TABLE 8

| | | | | | Resistance to abrasion melting | | Bleed / |
|---|---|---|---|---|---|---|---|
| | Polymeric diol (Obtained in Reference Example No.) | Inherent viscosity (dl/g) | Retention of long-chain HS[1] (%) | Amount worn by Taber abrasion (mg) | Area abrasion melted (rank) | State of melted surface | whitening state (rank) |

Properties of laminate of fibrous base layer and polyurethane layer

| Example | | | | | | | |
|---|---|---|---|---|---|---|---|
| 1 | PNOA-C (3) | 1.36 | 96 | 9 | 5 | ○ | ○ |
| 2 | PNMA-A (4) | 1.38 | 97 | 11 | 5 | ○ | ○ |
| 3 | PNIA-B (7) | 1.21 | 92 | 4 | 5 | ○ | ○ |
| 4 | PNMA-B (5) | 1.45 | 94 | 10 | 5 | ○ | ○ |
| 5 | PNTA-A (11) | 1.12 | 96 | 2 | 4–5 | ○ | ○ |
| 6 | PNMC-A (12) | 1.26 | 98 | 9 | 5 | ○ | ○ |
| 7 | PNMA-A (4) | 1.78 | 97 | 8 | 5 | ○ | ○ |
| 8 | PNIA-B (7) | 1.69 | 94 | 2 | 5 | ○ | ○ |
| Comparative Example | | | | | | | |
| 1 | PNOA-B (2) | 0.85 | 95 | 28 | 3 | Δ | ○ |
| 2 | PNOA-A (1) | 1.27 | 65 | 24 | 1 | X | ○ |
| 3 | PEA-A (13) | 0.93 | 60 | 21 | 1 | X | X |
| 4 | PEA-B (14) | 1.34 | 55 | 18 | 2 | X | X |
| 5 | PBA-A (15) | 0.87 | 92 | 30 | 1 | Δ | XX |
| 6 | PHA-A (16) | 0.87 | 94 | 25 | 2 | Δ | XXX |
| 7 | PNA-A (17) | 0.83 | 97 | 28 | 2 | Δ | XXX |
| 8 | PMPA-A (18) | 1.24 | 91 | 25 | 2 | X | ○ |
| 9 | PNIA-C (8) | 0.88 | 94 | 11 | 2 | X | ○ |
| 10 | PNIA-D (9) | 1.45 | 70 | 11 | 2 | Δ | ○ |
| 11 | PNIA-E (10) | 1.31 | 91 | 12 | 1 | Δ | ○ |

[1]Retention of long-chain hard segments when heat melted.

From the above Tables 7 and 8, it is understood:

The films and laminates consisting of fibrous layer and polyurethane layer obtained in Examples 1 through 8 by using polyurethanes having an inherent viscosity of at least 0.9 dl/g and a retention of long-chain hard segments when heat melted of at least 80%, the polyurethanes having been prepared using polymeric diols (a) satisfying the elements of the present invention, i.e. having low molecular diol units comprising at least 30 mole % of 1,9-nonanediol and having a crystallization enthalpy (ΔH) of not more than 70 J/g, are markedly superior to those of Comparative Examples 1 through 11 in all of abrasion resistance, resistance to abrasion melting and resistance to bleed out/whitening.

On the other hand, the films and laminates consisting of fibrous layer and polyurethane layer obtained in Comparative Examples 1 through 11 by using polyurethanes, which and/or the polymeric diols used for which do not satisfy one or not less than 2 of the above elements of the present invention are markedly inferior to those of Examples 1 through 8 in at least one, mostly at least 2 properties of abrasion resistance, resistance to abrasion melting and resistance to bleed out/whitening.

Obviously, numerous modifications and variations of the present invention are possible in light of the above teaching. It is therefore to be understood that within the scope of the appended claims, the invention may be practiced otherwise than as specifically described herein.

What is claimed is:

1. A laminate comprising a polyurethane layer and a fibrous base layer, said polyurethane layer being a melt molded layer of a thermoplastic polyurethane obtained from a polymeric diol (a) having a number average molecular weight of 1,500–4,000, an organic diisocyanate (b) and a chain extender (c) and having an inherent viscosity of at least 0.9 dl/g and a retention of long-chain hard segments when heat melted of at least 80%, said polymeric diol (a) having a crystallization enthalpy (ΔH) of not more than 70 J/g and having low molecular diol units comprising at least 30 mol % of 1,9-nonanediol units, the laminate having a resistance to abrasion melting of at least 4.

2. The laminate of claim 1, wherein the molar ratio of polymeric diol (A) to chain extender (c) ranges from 1:08 to 1:12.9.

3. The laminate of claim 1, wherein the polymeric diol is a polyester diol prepared by reacting a low molecular weight aliphatic diol and a dicarboxylic acid or ester.

4. The laminate of claim 3, wherein the aliphatic diol is a mixture of at least 30 mol % of 1,9-nonanediol and less than 70 mol % of at least one low molecular weight diol selected from the group consisting of ethylene glycol, 1,4,-butanediol, 2-methyl-1,3-propanediol, 1,6-hexanediol, 3-methyl-1,5-pentanediol, 2-methyl-1,8-octanediol and neopentyl glycol.

5. The laminate of claim 3, wherein said dicarboxylic acid is succinic acid, glutaric acid, adipic acid, azelaic acid, sebacic acid, dodecanedicarboxylic acid, terephthalic acid, isophthalic acid or orthophthalic acid.

6. The laminate of claim 1, wherein said organic diisocyanate (b) is a member selected from the group consisting of 4,4'-diphenylmethane diisocyanate, toluene diisocyanate, phenylene diisocyanate, naphthalene diisocyanate, isophorone diisocyanate, xylylene diisocyanate, 3,3'-dichloro-4,4'-diphenylmethane diisocyanate, 4,4'-dicyclohexylmethane, hexamethylene diisocyanate, hydrogenated xylylene diisocyanate and paraphenylene diisocyanate.

7. The laminate of claim 1, wherein said chain extender (c) is a low molecular weight diol, diamine, hydrazine or dicarboxylic acid hydrazide.

8. The laminate of claim 7, wherein said diol chain extender is a linear or branched aliphatic diol having 2 to 10 carbon atoms.

9. The laminate of claim 1, wherein the amount of isocyanate groups of the diisocyanate component (b) is 0.98 to 1.08 equivalent per equivalent of active hydrogen atoms possessed by polymeric diol (a), chain extender (c) and other components in the composition.

10. The laminate of claim 1, which has a thickness ranging from 0.5 to 5 mm.

11. A laminate comprising a polyurethane layer and a fibrous base layer, said polyurethane layer being a melt molded layer of the thermoplastic polyurethane composition of claim 3.

* * * * *